(12) United States Patent
Lavender et al.

(10) Patent No.: US 8,798,318 B2
(45) Date of Patent: Aug. 5, 2014

(54) SYSTEM AND METHOD FOR VIDEO EPISODE VIEWING AND MINING

(75) Inventors: Scott D. Lavender, Rochester, NY (US); Phillip Donegan, Widnes (GB); Daniel T. Jarvis, Rochester, NY (US); Shanmuga-Nathan Gnanasambandam, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 220 days.

(21) Appl. No.: 13/353,243

(22) Filed: Jan. 18, 2012

(65) Prior Publication Data

US 2013/0182893 A1 Jul. 18, 2013

(51) Int. Cl.
*G06K 9/00* (2006.01)

(52) U.S. Cl.
USPC .......................................... 382/103

(58) Field of Classification Search
USPC ........................... 382/100–107; 348/169–172
See application file for complete search history.

(56) References Cited

U.S. PATENT DOCUMENTS

| 2003/0058111 A1 | 3/2003 | Lee et al. |
| 2005/0058321 A1 | 3/2005 | Buehler |
| 2009/0134968 A1 | 5/2009 | Girgensohn et al. |

FOREIGN PATENT DOCUMENTS

WO 2007/118272 10/2007

OTHER PUBLICATIONS

European Patent Office Communication. European Search Report from European Patent Application No. 13151487.9 dated Apr. 19, 2013, 11 Pages.
Kumar, Pankaj et al. Framework for Real-Time Behavior Interpretation From Traffic Video. IEEE Transactions on Intelligent Transportation Systems, vol. 8, No. 1, Mar. 1, 2005, pp. 43-53.
Zhou, Zhongna et al. Activity Analysis, Summarization, and Visualization for Indoor Human Activity Monitoring. IEEE Transactions on Circuits and Systems for Video Technology, vol. 18, No. 11, Nov. 1, 2008, pp. 1489-1498.
Ho, Wallace Kai-Hong et al. Content-Based Scalable H.263 Video Coding for Road Traffic Monitoring. IEEE Transactions on Multimedia, vol. 7, No, 4, Aug. 1, 2005, pp. 1103-1108.
Tian, Bin et al. Video Processing Techniques for Traffic Flow Monitoring: A Survey. Intelligent Transportation Systems (ITSC), 2011 14th International IEEE Conference, Oct. 5, 2011, pp. 1103-1108.

*Primary Examiner* — Atiba O Fitzpatrick
(74) *Attorney, Agent, or Firm* — MH2 Technology Law Group LLP

(57) ABSTRACT

Systems and methods for video episode viewing and mining comprise: receiving video data comprising a plurality of frames representing images of one or more objects within a physical area; identifying a plurality of events within the video data, wherein an event represents a movement of an object of interest from a first location in a grid associated with the physical area to a second location in the grid; generating a plurality of event data records reflecting the plurality of events; and determining one or more frequent episodes from the plurality of event data records, wherein an episode comprises a series of events associated with a particular object of interest.

25 Claims, 5 Drawing Sheets

SYSTEM AND METHOD FOR VIDEO EPISODE VIEWING AND MINING

TECHNICAL FIELD

The present disclosure relates generally to methods, systems, and computer-readable media for collecting and mining video data to detect frequent movement patterns of objects, such as persons or vehicles, in a monitored physical area.

BACKGROUND

Areas such as traffic intersections, public places, and spaces within buildings are frequently monitored by video camera for a variety of reasons. For example, for security reasons, businesses, such as banks or stores, may monitor particular areas of a building interior to deter illegal activity and to collect information for law enforcement when violations of the law occur. Another application of video monitoring may be to analyze the behavior of mobile objects in a physical area. For example, traffic cameras may be installed to monitor the movement of vehicles in a particular intersection or to monitor the activity of patrons in a museum.

In any of these examples, using existing technologies, the recorded video data would need to be manually reviewed and analyzed for its intended purpose. For example, if it is determined that a theft has occurred in a store, it may be necessary to manually review video footage of a particular area to determine when and how the theft occurred. If the theft could have occurred within a period of days or weeks, such a manual review process could consume tens or hundreds of person-hours.

Similarly, if the purpose of monitoring an intersection is to identify frequent traffic patterns, manual review may be required to identify such frequent patterns from the video data. That manual review may involve analyzing many hours of recorded video footage of the intersection, compiling large numbers of observations about the behavior of individual vehicles, and then analyzing those compiled observations to identify frequent traffic patterns, if any.

Such manual review processes are not only tedious and time-consuming, but they are also subject to human error and inflexibility. For example, if human review of video footage does not result in the desired information being found—either due to oversight or incorrect criteria for the review—the review would likely need to be repeated all over again just to catch the missed observation or to use new criteria for the review.

Accordingly, there is a need for automated techniques for mining and analyzing video data to identify specific events and to detect overall frequent patterns or behaviors in a monitored physical area.

SUMMARY

The present disclosure addresses these and other improvements in the area of video analysis. In some embodiments, the present disclosure provides for receiving video data comprising a plurality of frames representing images of one or more objects within a physical area; identifying a plurality of events within the video data, wherein an event represents a movement of an object of interest from a first location in a grid associated with the physical area to a second location in the grid; generating a plurality of event data records reflecting the plurality of events; and determining one or more frequent episodes from the plurality of event data records, wherein an episode comprises a series of events associated with a particular object of interest.

Additional objects, advantages, and embodiments of the present disclosure will be set forth in part in the description that follows, and in part will be derived from the description, or may be learned by practice of the disclosed embodiments. The objects, advantages, and embodiments of the present disclosure will be realized and attained by means of the elements and combinations particularly pointed out in the appended claims. It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
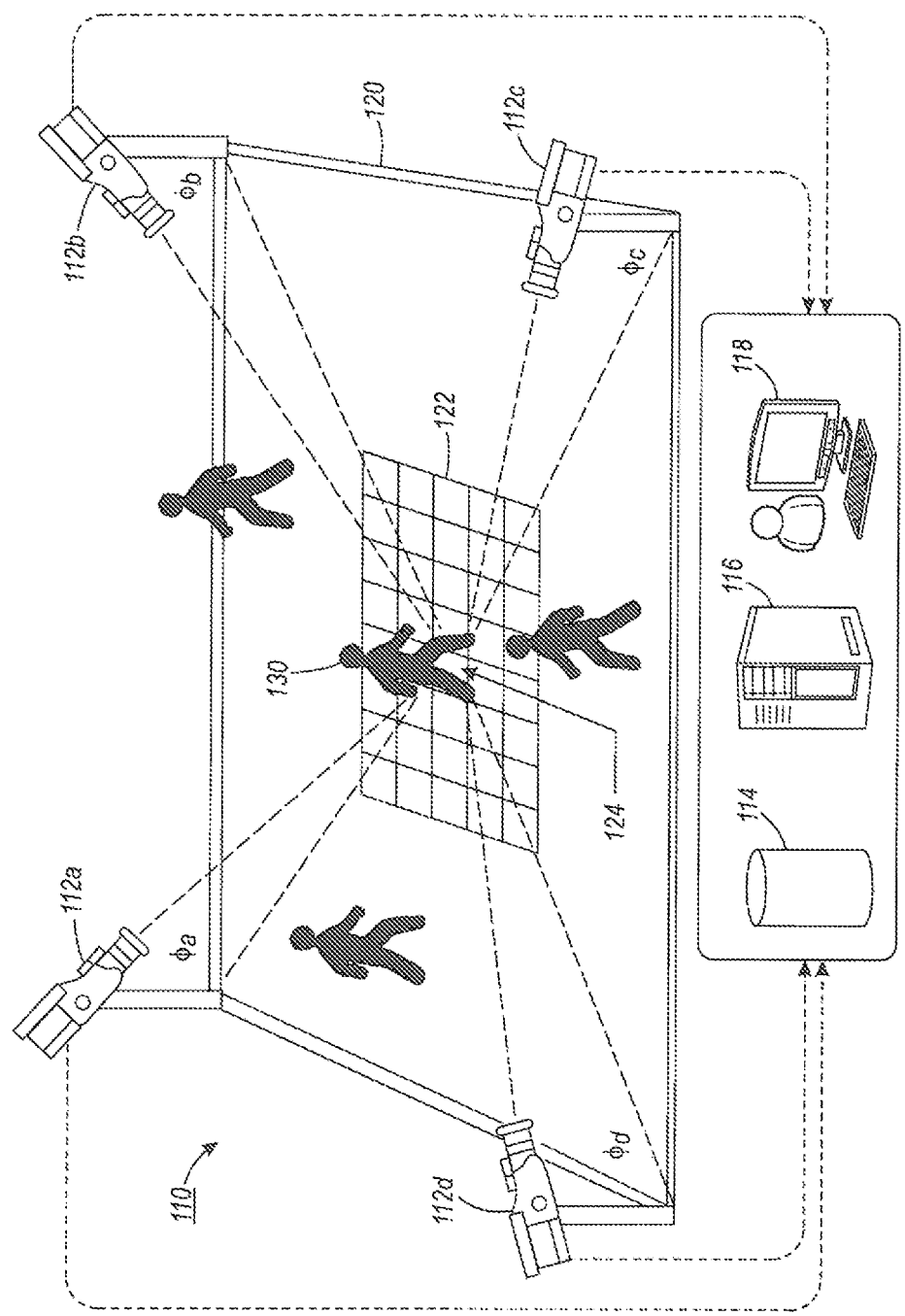
FIG. 1 is a diagram depicting an exemplary configuration for monitoring objects within a physical area using a plurality of cameras, consistent with certain disclosed embodiments.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

As depicted in FIG. 1, an area 120 may be monitored by one or more imaging devices such as cameras 112*a*-112*d*. Area 120 may be any physical space for which it is desired to monitor the movement of one or more objects therein. For example, area 120 may be a floor area within a building, such as a store, museum, government office, etc. Area 120 may also correspond to an outdoor venue, such as a public park, road, street corner, battlefield, etc.

Within area 120, one or more objects of interest may be monitored. In some embodiments, an object of interest may be an object, such as a person or a vehicle, for which information is sought about the object's motion within area 120. For example, as depicted in FIG. 1, an object of interest may be a person 130 walking through or within area 120, which may correspond to an exhibit within a museum. In other embodiments, area 120 may be a section of a road, and objects of interest may include vehicles traveling on or near the road.

Area 120 may be associated with a grid 122 that divides area 120 into a plurality of adjacent cells, such as cell 124. Although FIG. 1 depicts grid 122 as covering only a subset of area 120, grid 122 may be expanded to cover the entirety of area 120, such that each X-Y coordinate within area 120 can be classified as falling within a particular grid cell.

Cameras 112 may be components of a larger computing system 110 that also includes one or more data stores 114, one or more processing servers 116, and one or more client devices 118. Data stores 114 may be used for storing raw video data received from one or more cameras 112 and/or data records reflecting analysis of the video data. Processing servers 116 may be used to mine and analyze the video data and/or data records stored in data store 114. And client devices 118 may enable human operators to interface with system 110 for the purpose of configuring system 110, specifying criteria for video analysis, viewing the results of video analysis, etc. Those skilled in the art will appreciate that the components of system 110 are exemplary only, and that any suitable system of devices may be used to perform the disclosed embodiments.

Figure 2:
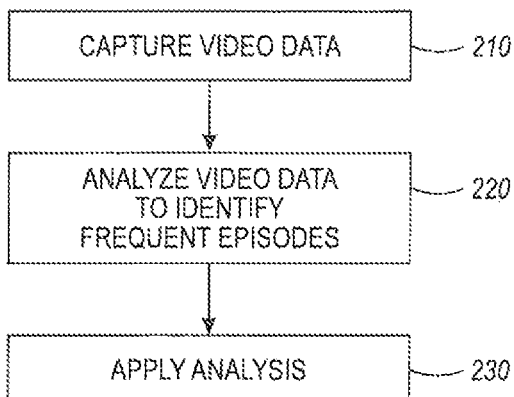
FIG. 2 is a flow diagram depicting an overview of exemplary stages within a process of video episode viewing and mining, consistent with certain disclosed embodiments.

As depicted in FIG. 2, a process of video episode viewing and mining may be divided into three basic steps or stages. Those skilled in the art will appreciate that the steps depicted in FIG. 2 are intended for illustration purposes only. It is not necessary that the steps depicted in FIG. 2 be performed in the order depicted or with the same degree of separation. Rather, FIG. 2 is meant to depict a high-level process in which each stage will be further described with respect to subsequent figures and/or paragraphs below.

In step 210, system 110 may capture video data of objects within area 120. For example, as depicted in FIG. 1, one or more cameras 112a-112d may be used to capture video data of an object 130 from multiple, different perspectives. Each camera 112 may be configured such that it is aware of which position within grid 122 it is recording at any given time. For example, each camera 112 may be positioned at a different location within or with respect to area 120. Different cameras may be positioned at different vertical heights and may have different vertical angles φ and different horizontal angles of rotation. Thus, for each camera to focus on a particular grid cell, such as grid cell 124, it may be necessary for each camera to use a different combination of vertical rotation, horizontal rotation, and digital and/or optical zoom parameters (hereinafter "camera settings").

Each camera 112 may therefore be configured in advance to determine which grid cell or cells it is recording by consulting known associative or mathematic relationships between its current camera setting and grid 122. Alternatively, such relationships may be maintained by one or more other devices in system 110, such as server 116. Server 116 may receive raw video data from each camera 112 and may associate the received video data with current settings for the camera (which may also be received from the cameras in real-time). Additionally, each camera 112 may be configured to receive a command to focus on a particular grid cell, in response to which each camera may apply the particular settings necessary to focus on the specified cell.

Alternatively, server 116 may instruct one or more cameras 112 to focus on a particular grid cell by determining the appropriate settings for each camera and sending each camera its respective settings for focusing on the cell. Although each camera 112 may be focused on the same grid cell at times, at other times, different cameras 112 may focus on different grid cells or areas of grid 122.

Each camera 112 may continually monitor one or more cells within grid 122—e.g., by capturing video data—and may transmit such video data to one or more data stores 114. Although depicted as a single data store in FIG. 1, data store 114 is not so limited, but may instead comprise multiple independent, redundant, or semi-redundant data stores that may be collocated or spread across one or more buildings or even jurisdictional boundaries. In some embodiments, system 110 may be used to monitor a plurality of separately located areas 120, and video data from each camera may be fed into a cloud-based storage interface, where it may be stored in a plurality of different memory devices, the implementation of which is abstracted away from cameras 112.

In some embodiments, any such video data that is recorded by a camera 112 may be stored in data store 114 along with both the grid location and/or camera settings associated with the recorded data and time information associated with the recorded data. For example, captured video data may be represented and stored as a series of sequential still-image frames. Each such frame may be stored in data store 114 along with a timestamp indicating the time at which it was captured and the camera settings used to capture the frame. Such frame metadata may be determined or transmitted by the capturing camera 112 or one or more other devices in system 110.

In step 220, system 110 may analyze the captured video data to determine one or more frequent episodes. The captured video data may be analyzed in real-time as it is captured by one or more cameras 112. In other embodiments, the captured video data may first be stored in one or more data stores 114, and may be analyzed at a later time—e.g., after enough video data has been accumulated. For example, in the context of museum monitoring, video data may be captured during a certain period of the day, such as when the museum is open to the public, and a batch process may be run each night to analyze the previous day's captured video data.

As enumerated in FIG. 2, the captured video data may be analyzed to identify one or more frequent episodes. In some embodiments, an episode may be considered a sequence of events related to the movement or behavior of a particular object of interest within area 120, where each event may represent a constituent gesture or increment of movement or behavior by the particular object of interest. A frequent episode may represent a pattern of behavior that is exhibited with a threshold degree of frequency by different objects within the area 120 over time.

In some embodiments, a frequent episode may map to a route or trajectory that is inferred based on the frequent episode (and the sequence of events of which individual episodes are comprised). Thus, a physical example of a frequent episode may be a common path or movement pattern by persons or objects within a given space. After one or more frequent episodes have been determined, as further described below, such episodes may be presented to a user in visual form as one or more graphical overlays on a real or synthetic image of grid area 122.

Figure 3:
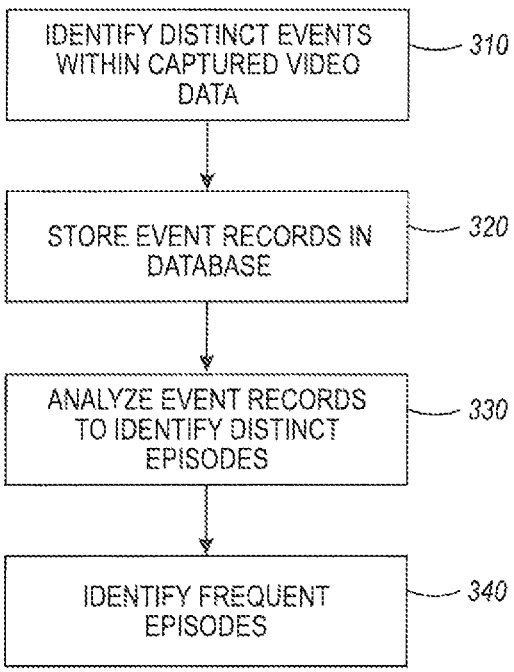
FIG. 3 is a flow diagram depicting an exemplary method of mining video data to identify frequent episodes, consistent with certain disclosed embodiments.
Figure 4:
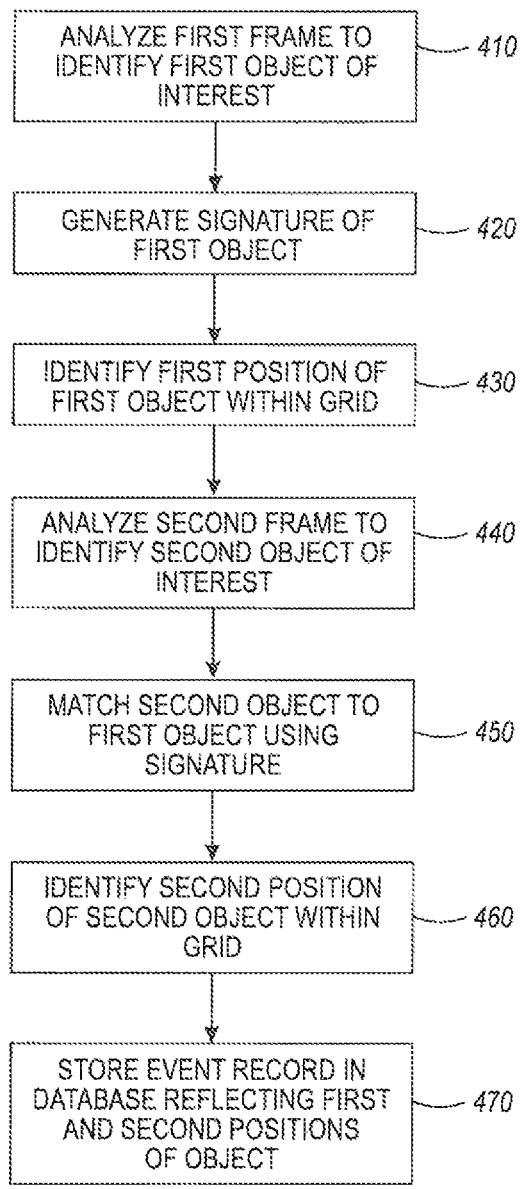
FIG. 4 is a flow diagram depicting an exemplary method of generating an event record from video data, consistent with certain disclosed embodiments.

Attention will now be turned to FIG. 3, which describes certain exemplary operations that may be undertaken to identify one or more frequent episodes. In step 310, system 110 may identify distinct events within the captured video data. As described above, an event may represent a distinct change in the state or position of a particular object of interest within area 120. FIG. 4 depicts certain exemplary operations by which a distinct event may be identified and represented in memory.

In step 410, system 110—e.g., using server 116—may analyze a first frame to identify a first object of interest. For example, system 110 may select any given frame stored in data store 114. Using various video and/or image analysis tools or algorithms, server 116 may identify an object of interest. For example, image data within a given frame may be conceptually divided into environmental data and subject data. Environmental data may represent certain marker objects within area 120 that are expected to always or usually be present, such as the floor of area 120 and one or more windows, doors, light fixtures, etc. In the context of museum monitoring, it may be expected that video frames capturing certain grid cells will usually contain images of certain paintings on a wall or entrances to other exhibits.

Thus, in some embodiments, an object of interest may be identified within a given frame by filtering out any expected environmental data or marker objects and determining that graphical data relating to a non-marker object within the frame is present. Such a filtering operation may also help to reduce the computational burden when analyzing graphical data within the frame.

In other embodiments, an object of interest may be identified by determining that an object is in motion. For example, analysis of pixel data in the frame may reveal certain blurring characteristics of the object consistent with motion. Or, one or more additional (e.g., adjacent) frames may be analyzed to detect differences in the position of an object between frames. For example, some marker objects within the environmental data, such as potted plants, doors, windows, traffic lights, etc., may be expected to remain essentially stationary in successive frames in the same grid cell. Such marker objects may therefore be used as reference points for other objects within a particular grid cell or grid area. If certain non-environmental graphical data is found to differ in its position between frames with respect to one or more marker objects, then the data may be identified as an object in motion and, hence, an object of interest.

In still other embodiments, objects of interest may be identified based on the consistency of their graphical data with one or more characteristics associated with known objects of interest. For example, system 110 may be programmed with several category signatures associated with certain categories of objects. A category signature may specify certain features that are expected to be common to all objects belonging to that category.

For example, system 110 may have access to a category signature that may be used to identify humans within frames. Such a category signature may instruct server 116 to identify an object within a frame as a human only if server 116 is able to identify colors within the object consistent with one or more skin tones. The category signature may also require that the object be shaped or configured in certain ways—for example, an area consistent with a face being on top—or move in certain ways.

If system 110 is able to identify an object of interest using a category signature, then system 110 may also calculate a feature extraction confidence. The feature extraction confidence may represent a confidence metric, numeric or otherwise, that system 110 has identified an object of interest belonging to a certain category based on the degree to which the graphical data of the object of interest matches the features specified by the category signature.

In step 420, once system 110 identifies an object of interest, system 110 may generate an object signature associated with the object. In some embodiments, an object signature may be used to represent characteristics of the particular object of interest such that the same object can be tracked across multiple frames. For example, if the object of interest is a person, then an object signature may represent particular facial features, skin tones, dimensions, or clothing colors associated with that person.

Thus, whereas a category signature may represent features that are expected to be common across multiple different objects within a certain category, an object signature may be used to identify features that are unique to a particular object of interest or that may otherwise be used to distinguish the object from other objects in the same or other frames. Nonetheless, in order to track the object of interest between multiple frames, the object signature may reflect certain features of the object that are expected to remain essentially unchanged between frames.

In addition to generating an object signature to identify the object of interest within frame data, system 110 may assign a unique identifier ("object ID") to the object of interest and/or its signature. The object ID may be numeric, and may be used to record, for a given frame, whether or not a particular object of interest is detected in the frame.

In step 430, system 110 may identify the position of the object on the grid during the first frame ("first position"). For example, as described above, cameras 112 may be calibrated such that, at any given time, they are able to identify the grid cell(s) for which they are recording image data, given their current angles of tilt, rotation, panning, zooming, etc., or such positional information may be determined by a device in system 110 that is receiving video data from cameras 112.

In step 440, system 110 may analyze a second, different frame to identify a second object of interest. For example, similar to the operations performed with respect to the first frame, the second frame may be analyzed to determine whether there are any objects of interest using reference objects, category signatures, etc.

Figure 5:
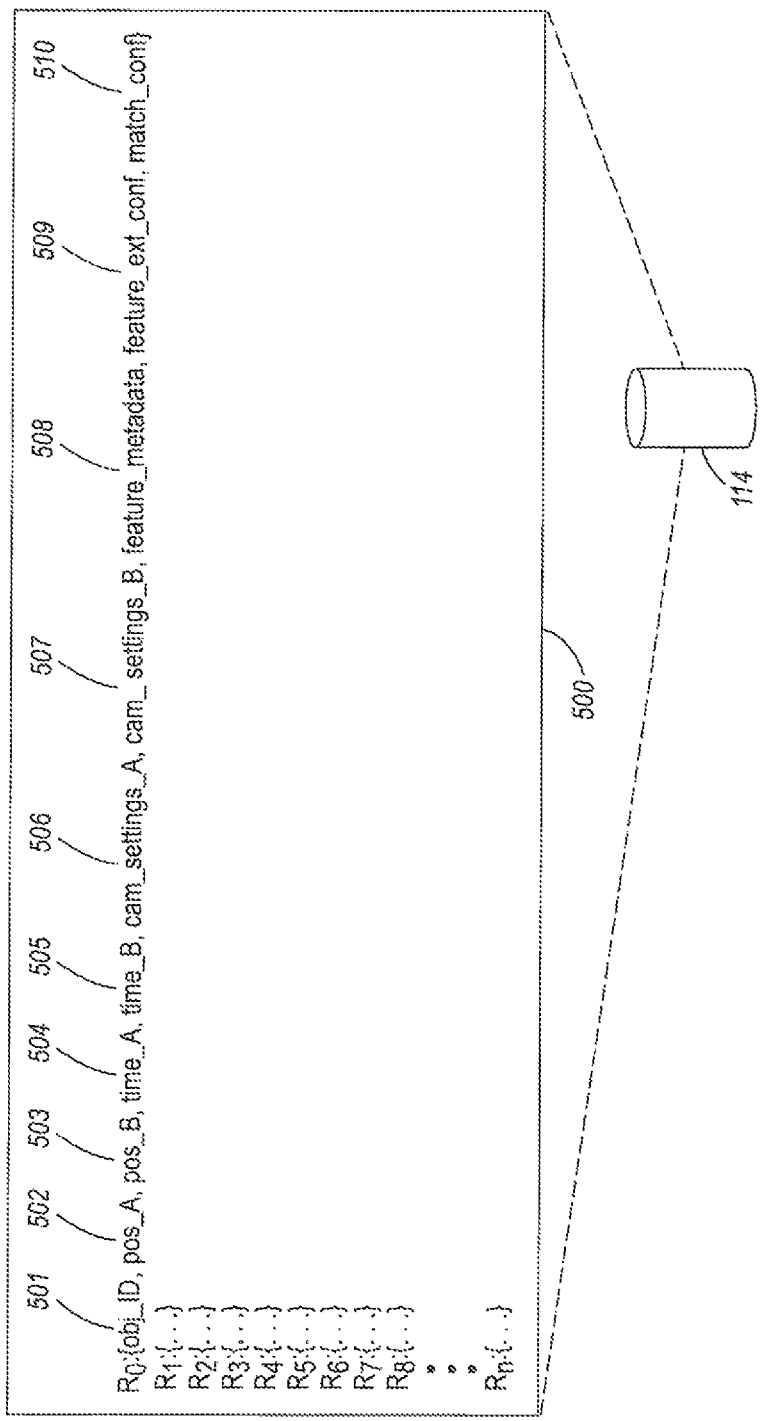
FIG. 5 is diagram depicting an exemplary event record, consistent with certain disclosed embodiments.

In step 450, system 110 may determine whether the second object of interest is the same as the first object of interest by comparing graphical characteristics of the second object to the signature associated with the first object. If the second object matches the first object, then it may be determined that the first object has been detected in both the first frame and the second frame. In step 460, the position of the second object on the grid (i.e., a "second position") may be determined. Finally, in step 470, system 110 may store an event record in the database reflecting the first and second positions of the object, as well as other data. FIG. 5 is a diagram depicting such an exemplary event record, consistent with certain disclosed embodiments.

As depicted in FIG. 5, data store 114 may store a table 500 that includes a set of records $R_0$ through $R_n$ reflecting various events detected with respect to particular objects of interest. Exemplary event record fields are depicted with respect to event record $R_0$ and will now be further described.

An event record may include an "obj_ID" field 501 representing the object ID assigned to a particular object of interest. The event record may include a "pos_A" field 502 representing the grid position of the object of interest at a first time, identified by "time_A" field 504, and a "pos_B" field 503 representing the grid position of the object of interest at a second time, identified by "time_B" field 505. If the "pos_A" and "pos_B" fields differ, or differ by a threshold amount, then the event record may reflect motion by the object of interest over time within the grid, as detected by system 110. The positions identified by fields 502 and 503 may also be referred to as "origin" and "destination" points, respectively, and the timestamps identified by fields 504 and 505 may be referred to as "origin" and "destination" timestamps, respectively.

In addition to the foregoing fields, an event record may include various metadata fields. For example, an event record may include information representing the settings of one or more cameras 112 that recorded the object at the first time ("cam_settings_A" field 506) and at the second time ("cam_settings_B" field 507). As described above, such camera settings may include angles of rotation or tilt, zoom and focus values, etc. Such camera settings may be used to confirm or enhance positional data with respect to detected objects of interest.

In some embodiments, an event record may include a "feature_metadata" field. 508 that reflects features or graphical characteristics that were used to determine the occurrence of the same object between two different frames. For example, "feature_metadata" field 508 may include all or part of the object signature used to match the second object of interest with the first object of interest in step 450.

Moreover, because it may be rare that two objects of interest match perfectly between two different frames, the event record may also include metadata concerning the strength of the match in the event record. For example, the event record may include a "feature_ext_conf" field 509 reflecting a level of confidence that the object's identifying features were correctly or accurately extracted from the frame image data. The event record may further include a "match_conf" field 510 reflecting an overall level of confidence that the object identified in the second frame truly matches the object identified in the first frame, and thus a level of confidence that the same object moved from the first position within the grid to the second position.

Those skilled in the art will appreciate that the foregoing event record fields are exemplary only, and that other types of information may be captured or stored in different manners. For example, if a large number of frames are captured per second, it may be efficient to sample the captured frames rather than to store an event record for each pair of immediately adjacent frames in which the same object is detected. Thus, in some embodiments, time fields 504 and 505 may represent average times across several frames or a time-range.

Moreover, although each camera 112 may each capture a different video frame at a given time, if multiple cameras 112 are focused on the same or overlapping grid positions, then data from each camera's recording of the same location at the same times may be used to create the event record, rather than creating a separate event record for each frame-pair for each camera. Thus, for example, the "feature_ext_conf" field 509 may reflect an average confidence level that certain features were extracted across multiple cameras. Still further, if multiple objects of interest are detected in a given frame, each such object of interest may result in a distinct event record being created and stored if the object of interest can be identified in a second frame bearing a different timestamp.

In some embodiments, system 110 may also refrain from storing an event record if the values of the position fields 502 and 503 do not differ by a requisite threshold. Such a closeness in values may reflect a lack of motion by the object of interest. And thus, an event record reflecting the object's lack of motion between a first time and second time may be omitted from database 114 to reduce the amount of data needing to be stored and subsequently analyzed. Similarly, system 110 may refrain from storing an event record if confidence fields 509 and/or 510 are below a requisite threshold, as low confidence levels may reflect an uncertainty as to whether the object category was correctly identified or whether two objects of interest in different frames were in fact the same object.

In some embodiments, each of the frames captured by cameras 112 (or a combination thereof) may be subjected to one or more operations described with respect to FIG. 4. That is, for each frame captured by one or more of cameras 112, it may be determined whether an adjacent or proximate frame reflects motion by one or more objects of interest. Alternatively, as described above, frames captured by cameras 112 may be sampled to detect motion at a higher level of granularity.

In either case, however, returning to FIG. 3, by analyzing frame pairs received from cameras 112, system 110 may construct and store a plurality of event records in database 114 (step 320). Such records may reflect the recorded movements of a plurality of different objects of interest within grid 122.

Once a sufficient number of event records have been generated and stored in database 114, in step 330, system 110 may analyze the event records to identify distinct episodes. In some embodiments, an "episode" may refer simply to a set of two or more events that reflect the movement of a particular object of interest over time. In other embodiments, an "episode" may be more specifically defined as a sequence of two or more event records such that (i) in adjacent records, the destination point of the first record is the origin point of the second, subsequent record; (ii) in adjacent records, the timestamp of the second record exceeds that of the first, prior record; (iii) within a record, the destination timestamp is later than that of the origin timestamp; (iv) each event record in the episode specifies the same object ID; and (v) the match confidence between each adjacent pair of records in the episode is within a specified tolerance range. Those skilled in the art will appreciate that the foregoing definition of an episode may be modified, as needed, for events records that were generated from sampled frames, as opposed to immediately adjacent frames.

In some embodiments, all distinct multi-event episodes may be catalogued in another data store, such as another table in database 114. In other embodiments, episodes may be analyzed in place within database 114 to determine frequent patterns.

In step 340, system 110 may analyze the events reflected in database 114 to identify frequent episodes. In some embodiments, frequent episodes may be identified only after distinct episodes (both frequent and non-frequent) have been identified and collected in step 330. In other embodiments, the steps of 330 and 340 may be performed essentially in tandem.

A frequent episode may refer to a type of episode that is found to occur with a threshold amount of frequency over either other episodes within database 114 or according to certain specified criteria. For example, if the area 120 for which video analysis is being performed is a museum, an episode may be a particular path that some visitors take when moving through or within area 120. Thus, if analysis of the event records in database 114 reveals that a threshold number of different visitors follow the same or similar path, that information may be represented as a frequent episode—here, a frequent path that museum visitors take. Similarly, a frequent episode in the context of a traffic monitoring application may represent a frequent traffic pattern or path that vehicles take.

Unlike a specific episode, which may be confined to only a single object ID, a frequent episode may be generic across objects. That is, a frequent episode may be identified, by definition, as a frequent event pattern that spans multiple episodes associated with multiple distinct objects of interest. Nonetheless, object types or categories may also define the scope of a frequent episode. For example, in the context of a traffic monitoring application, a frequent episode may reflect a particular path that cars in particular take, or may reflect whether trucks and/or buses typically travel in correct lanes. Similarly, in a museum-monitoring application, a frequent episode may reflect common paths that children follow within area 120. In any of these examples, the frequent episode may be defined in part by the category of the objects of interest within the episode—here, cars, trucks, children, etc.

As described above, system 110 may collect and analyze video data recorded by one or more cameras, and may reduce such analysis to simple textual data in the form of a plurality of event records. Because the event records may thereafter be analyzed as simple textual database records, any suitable algorithm may be used to identify frequent episode patterns. For example, U.S. patent application Ser. No. 13/284,356, which is also assigned to the assignee of this application, and is hereby incorporated by reference, describes various techniques that may be used to identify frequent episodes across one or more domains. Similarly, U.S. patent application Ser. No. 13/109,343, which is also assigned to the assignee of this application, and is hereby incorporated by reference, also discloses various techniques that may be used to determine patterns from data.

Instead of, or in addition to, analyzing all event records stored in database 114 to identify frequent episodes, the data stored in database 114 may be analyzed in other, more focused ways. In some embodiments, system 110 may allow a user—e.g., interacting through client device 118—to search database 114 to locate specific objects and/or episodes. For example, a user may instruct system 110 to search through database 114 to identify whether a man in a yellow shirt was detected. System 110 may then search through event records and determine whether such an object of interest was detected by consulting metadata representing such object features in the event records—e.g., by consulting the "feature_metadata" field 508 and/or the "feature_ext_conf" field 509.

If the searched-for object is found within database 114, then the user may further instruct system 110 to locate all event records associated with the particular object of interest (e.g., as identified by the "obj_ID" field 501) and to identify any episodes with respect to that object. For example, system 110 may identify a path traversed by the man in the yellow shirt. Using positional data reflected in fields 502 and 503, system 110 may further illustrate the identified path as a graphical overlay on a real or synthetic image of grid area 122.

In some embodiments, event records may further contain frame identifiers or other data capable of linking the recorded events to specific video frames. Using such a linkage, system 110 may be instructed to retrieve and present video footage of the located subject, including footage of the located subject and/or path from multiple different camera angles. These applications may, for instance, be useful in law enforcement applications where it may be desired to track a particular crime suspect having known physical features. The above-described techniques may be used to quickly identify whether the suspect had been recorded by any video camera whose video data has been fed into system 110. In particular, the footage of multiple, different cameras may be so analyzed using a single process without the need for a person to manually review such footage, which may collectively span tens or hundreds of hours.

System 110 may further allow users to specify the criteria used to perform any frequent episode identification or object searches. For example, using client device 118, a user may specify a particular confidence threshold range for extracting features or matching objects, which may be adjusted to broaden or narrow results as necessary. The user may also specify constraints for particular frequent episodes or objects to be identified, such as limiting analysis to particular categories of objects (e.g., humans, buses, etc.) or to particular areas within grid 122. Those skilled in the art will appreciate that the foregoing user controls are exemplary only, and that other criteria or constraints may be used.

Returning now to FIG. 2, once frequent episodes have been identified, the information obtained from that analysis may then be applied in various ways. For example, in some embodiments, frequent episodes may represent popular routes, paths, or actions by particular types of objects in particular contexts, such as those of vehicles in a traffic context or those of people in a building or public space. That information may be applied both positively and negatively, as further described below.

Positively applying information learned from frequent episodes may involve making design or policy decisions that comport with common patterns of behavior. For example, in the museum context, if analysis of identified frequent episodes reveals that visitors are more likely to view certain exhibits in a particular order, that information may be used to design or re-design the layout of exhibits to conform to that particular order. Similarly, in the traffic context, analysis of frequent episodes may reveal common traffic patterns or routes in an intersection, or may reveal that accidents frequently occur when particular traffic conditions occur. As a result, transportation authorities may design future intersections (or redesign the monitored intersection) to better accommodate the common patterns or to better avoid accidents.

Negatively applying information learned from frequent episodes may involve detecting and flagging episodes that are not frequent. For example, analysis of the identified frequent episodes may reveal a standard deviation or "norm" for certain objects in area 120. Once such a norm has been determined from the frequent episodes, event data may be reanalyzed to determine whether any episodes with respect to a particular object exceed the norm by a threshold amount. In some embodiments, activity inconsistent with a frequent pattern may be considered suspicious activity and may be flagged for further analysis, including potentially manual analysis, to determine whether the inconsistency was part of improper or illegal activity.

Thus, in the law enforcement context, for example, these techniques may be used to analyze large amounts of video data after a crime has been committed to identify potentially suspicious activity that could provide a lead for investigation of the crime. In some embodiments, if it is determined that an object of interest was in a non-visible location—e.g., a position outside of grid 122—that action may itself be considered odd or suspect and may be flagged accordingly.

Information learned from analysis of stored video data and event records may also be used for certain applications intended to augment reality for users. For example, system 110 may also be used to monitor persons, vehicles, or other objects in real-time. In response to determining that a person has engaged in a certain sequence of actions or is in a particular location, system 110 may use information learned from analysis of frequent episodes to make recommendations in real-time to users. For example, in the museum context, if system 110 determines that a visitor is in a particular location, system 110 may suggest recommended routes or exhibits related to that position based on common patterns observed with respect to previous visitors.

Similarly, in the traffic context, in response to detecting a certain traffic pattern, system 110 may cause traffic lights or other traffic devices to direct traffic in a particular way to mitigate against accidents, given information about accidents that have frequently resulted from the same or similar traffic patterns in the past. Thus, in some embodiments, system 110 may take responsive actions in real-time based on frequent episode information.

In some embodiments, stored video and event data may also be used as a "window into the past." For example, a particular episode may be selected from database 114 for exploration, and a hand-held viewing device, such as a mobile smartphone or tablet, may be communicatively coupled to system 110 to enable a user to view the episode in an enhanced manner. The user may walk around in the parts of grid 122 in which the episode occurred with the viewing device. The position, orientation, and direction of the viewing device may be monitored, and the display on the viewing device may present video footage of the episode in accordance with the current position, orientation, and direction of the viewing device.

That is, if the viewing device is pointing toward a grid cell that was monitored by one or more cameras 112 in the episode, then footage of episode may be presented to the user from the camera that had an optical perspective most analogous to the current position, orientation, and direction of the viewing device. In this manner, the user may "walk around" an object of interest that was recorded in an episode to view the object from different angles and perspectives simply by moving and reorienting the viewing device.

Figure 6:
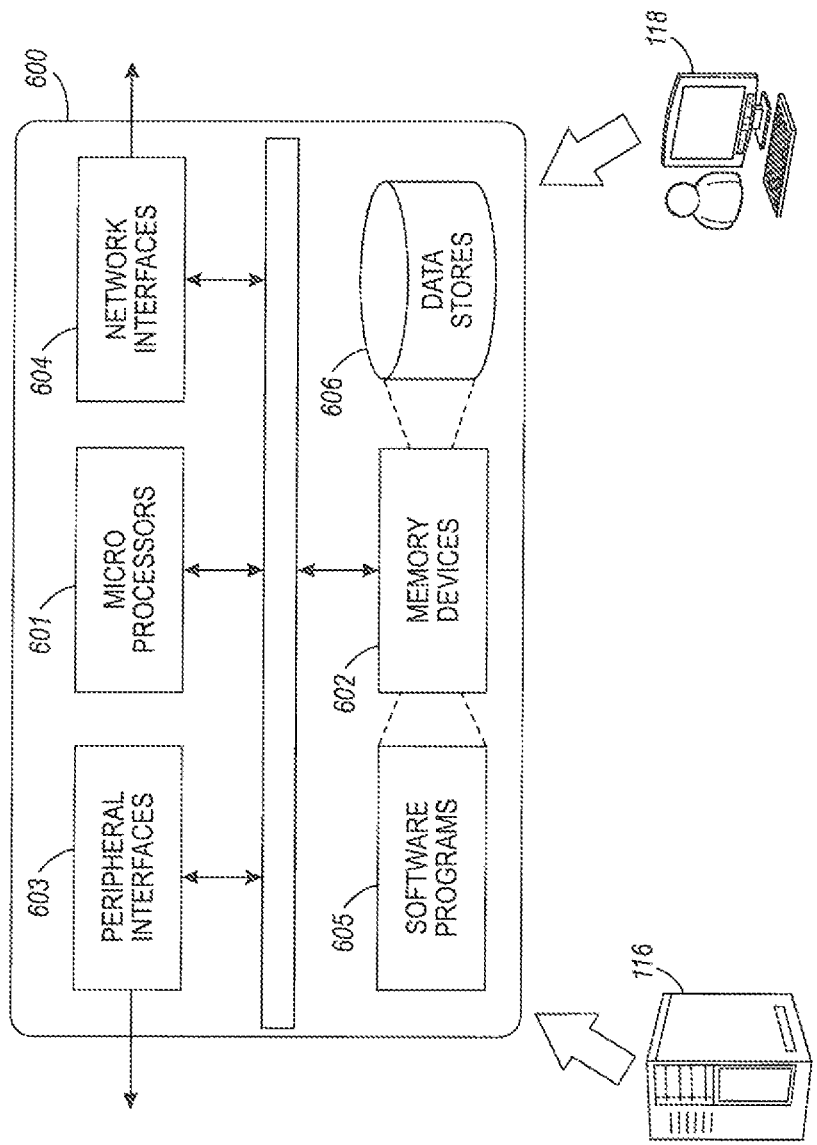
FIG. 6 is a diagram depicting an exemplary hardware configuration that may be used to practice one or more of the disclosed embodiments.

FIG. 6 is a diagram depicting an exemplary hardware configuration 600 for system 110 and/or any individual devices within system 110. Hardware configuration 600 may comprise one or more microprocessors 601 of varying core configurations and clock frequencies; one or more memory devices or computer-readable media 602 of varying physical dimensions and storage capacities, such as flash drives, hard drives, random access memory, etc., for storing data, such as images, files, and program instructions for execution by one or more microprocessors 601; one or more network interfaces 604, such as Ethernet adapters, wireless transceivers, or serial network components, for communicating over wired or wireless media using protocols, such as Ethernet, wireless Ethernet, GSM, WiMAX, etc.; and one or more peripheral interfaces 603, such as keyboards, mice, touchpads, computer screens, touchscreens, etc., for enabling human interaction with and manipulation of system 110. Peripheral interfaces 603 may connect to one or more cameras 112, which may also be part of hardware configuration 600. In some embodiments, the components of hardware configuration 600 need not be enclosed within a single enclosure or even located in close proximity to one another.

Memory devices 602 may further be physically or logically arranged or configured to provide for or store one or more data stores 606, such as one or more file systems or databases, and one or more software programs 605, which may contain interpretable or executable instructions for performing one or more of the disclosed embodiments. Those skilled in the art will appreciate that the above-described componentry is exemplary only, as system 110 may comprise any type of hardware componentry, including any necessary accompanying firmware or software, for performing the disclosed embodiments. System 110 may also be implemented in part or in whole by electronic circuit components or processors, such as application-specific integrated circuits (ASICs) or field-programmable gate arrays (FPGAs).

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

In the above description and in the below claims, unless specified otherwise, the term "adjacent" and its variants are to be interpreted as describing two frames, events, or other pieces of data in which the second piece of data follows the first piece of data within a sequence, even if that sequence itself was extracted from a more granular sequence through sampling or other techniques.

What is claimed is:

1. A computer-implemented method of automatically analyzing video data to identify movement patterns, the method comprising:
   receiving, from one or more cameras, video data comprising a plurality of frames representing images of one or more objects within a physical area, wherein:
      the physical area is associated with a grid, the grid comprising a plurality of grid cells; and
      each camera of the one or more cameras is configured to capture video of one or more grid cells of the grid;
   identifying a plurality of events within the video data, wherein an event represents a movement of an object of interest from a first grid cell of the grid associated with the physical area to a second grid cell of the grid;
   generating a plurality of event data records reflecting the plurality of events; and
   determining one or more frequent episodes from the plurality of event data records, wherein an episode comprises a series of events associated with a particular object of interest.

2. The method of claim 1, wherein the video data is captured from a plurality of cameras having different optical perspectives with respect to the physical area.

3. The method of claim 1, wherein identifying an event comprises:
   identifying a first object of interest in a first frame;
   identifying a first grid position of the first object of interest in the first frame;
   identifying a second object of interest in a second frame, wherein the second frame is adjacent to the first frame;
   identifying a second grid position of the second object of interest in the second frame;
   determining that the second object of interest matches the first object of interest; and
   determining that the second grid position differs from the first grid position.

4. The method of claim 3, further comprising:
   generating an event data record reflecting the first grid position and the second grid position of a monitored object of interest, wherein the monitored object of interest corresponds to the first object of interest and the second object of interest.

5. The method of claim 4, further comprising:
   generating an object identifier that uniquely identifies the monitored object of interest; and
   storing the object identifier in the event data record.

6. The method of claim 3, wherein determining that the second object of interest matches the first object of interest comprises:
   generating an object signature, wherein the object signature reflects distinct graphical characteristics of the first object of interest; and
   determining that the second object of interest matches the object signature.

7. The method of claim 6, wherein determining one or more frequent episodes comprises:
   identifying a series of events such that, for each event, the second object matches the object signature within a specified tolerance range.

8. The method of claim 1, further comprising:
   identifying the object of interest by determining that a detected object in the video data is not a marker object.

9. The method of claim 1, further comprising:
   identifying the object of interest by determining that a detected object in the video data matches characteristics of a particular category of objects.

10. The method of claim 9, wherein determining one or more frequent episodes comprises:
   identifying a series of events such that, for each event, the object of interest matches characteristics of the particular category within a specified tolerance range.

11. The method of claim 1, wherein the one or more frequent episodes represent one or more paths frequently traveled by humans in the physical area.

12. The method of claim 1, wherein:
   the physical area is a traffic area; and
   the one or more frequent episodes represent one or more common traffic patterns in the traffic area.

13. A system configured to automatically analyze video data to identify movement patterns, the system comprising:
   a processing system comprising one or more processors; and
   a memory system comprising one or more computer-readable media, wherein the computer-readable media contain instructions stored thereon that, when executed by the processing system, cause the system to perform operations comprising:
   receiving, from one or more cameras, video data comprising a plurality of frames representing images of one or more objects within a physical area, wherein:
      the physical area is associated with a grid, the grid comprising a plurality of grid cells; and
      each camera of the one or more cameras is configured to capture video of one or more grid cells of the grid;
   identifying a plurality of events within the video data, wherein an event represents a movement of an object of interest from a first grid cell of the grid associated with the physical area to a second grid cell of the grid;
   generating a plurality of event data records reflecting the plurality of events; and
   determining one or more frequent episodes from the plurality of event data records, wherein an episode comprises a series of events associated with a particular object of interest.

14. The system of claim 13, wherein the video data is captured from a plurality of cameras having different optical perspectives with respect to the physical area.

15. The system of claim 13, wherein identifying an event comprises:
   identifying a first object of interest in a first frame;
   identifying a first grid position of the first object of interest in the first frame;
   identifying a second object of interest in a second frame, wherein the second frame is adjacent to the first frame;
   identifying a second grid position of the second object of interest in the second frame;
   determining that the second object of interest matches the first object of interest; and
   determining that the second grid position differs from the first grid position.

16. The system of claim 15, the operations further comprising:
   generating an event data record reflecting the first grid position and the second grid position of a monitored object of interest, wherein the monitored object of interest corresponds to the first object of interest and the second object of interest.

17. The system of claim 16, the operations further comprising:
   generating an object identifier that uniquely identifies the monitored object of interest; and
   storing the object identifier in the event data record.

18. The system of claim 15, wherein determining that the second object of interest matches the first object of interest comprises:
   generating an object signature, wherein the object signature reflects distinct graphical characteristics of the first object of interest; and
   determining that the second object of interest matches the object signature.

19. The system of claim 18, wherein determining one or more frequent episodes comprises:
   identifying a series of events such that, for each event, the second object matches the object signature within a specified tolerance range.

20. The system of claim 13, the operations further comprising:
   identifying the object of interest by determining that a detected object in the video data is not a marker object.

21. The system of claim 13, the operations further comprising:
   identifying the object of interest by determining that a detected object in the video data matches characteristics of a particular category of objects.

22. The system of claim 21, wherein determining one or more frequent episodes comprises:
   identifying a series of events such that, for each event, the object of interest matches characteristics of the particular category within a specified tolerance range.

23. The system of claim 13, wherein the one or more frequent episodes represent one or more paths frequently traveled by humans in the physical area.

24. The system of claim 13, wherein:
   the physical area is a traffic area; and
   the one or more frequent episodes represent one or more common traffic patterns in the traffic area.

25. A computer-implemented method of automatically analyzing video data to identify movement patterns, the method comprising:
   receiving, from one or more cameras, video data comprising a plurality of frames representing images of one or more objects within a physical area, wherein:
      the physical area is associated with a grid, the grid comprising a plurality of grid cells; and
      each camera of the one or more cameras is configured to capture video of one or more grid cells of the grid;
   identifying a plurality of events, wherein identifying an event comprises:
      identifying a first object of interest in a first frame;
      identifying, within a first grid cell of the grid, a first grid position of the first object of interest in the first frame;
      identifying a second object of interest in a second frame, wherein the second frame is adjacent to the first frame;

identifying, within a second grid cell of the grid, a second grid position of the second object of interest in the second frame;

determining that the second object of interest matches the first object of interest;

determining that the second grid position differs from the first grid position, based on identifying that the first grid position is within the first grid cell and that the second grid position is within the second grid cell; and generating an event data record reflecting the first grid position and the second grid position of a monitored object of interest, wherein the monitored object of interest corresponds to the first object of interest and the second object of interest; and determining one or more frequent episodes from the generated event data records, wherein an episode comprises a series of events associated with a monitored object of interest.

* * * * *